US007760382B2

(12) United States Patent
Murata

(10) Patent No.: US 7,760,382 B2
(45) Date of Patent: Jul. 20, 2010

(54) IMAGE FORMING SYSTEM WITH USER AUTHENTICATION CORRELATING USER TO DEPARTMENT FOR ACCOUNTING PURPOSES

(75) Inventor: Ryoji Murata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1147 days.

(21) Appl. No.: 11/086,091

(22) Filed: Mar. 21, 2005

(65) Prior Publication Data

US 2005/0216514 A1  Sep. 29, 2005

(30) Foreign Application Priority Data

Mar. 23, 2004  (JP) ............... 2004-085605

(51) Int. Cl.
*G06F 3/12* (2006.01)
(52) U.S. Cl. ............. 358/1.15; 358/1.14; 358/296; 399/79; 705/30; 705/34; 705/67; 707/104.1; 707/6; 707/229; 713/170; 726/4
(58) Field of Classification Search ................ 358/1.15
See application file for complete search history.

(56) References Cited

U.S. PATENT DOCUMENTS

| 6,216,113 | B1 * | 4/2001 | Aikens et al. ............... 705/34 |
| 6,408,019 | B1 * | 6/2002 | Pickering et al. ............ 375/130 |
| 6,545,767 | B1 * | 4/2003 | Kuroyanagi ............... 358/1.14 |
| 2002/0062453 | A1 * | 5/2002 | Koga ........................ 713/202 |
| 2002/0147838 | A1 * | 10/2002 | Pisarsky .................... 709/238 |
| 2003/0117641 | A1 * | 6/2003 | Sugiyama .................. 358/1.14 |
| 2003/0120954 | A1 * | 6/2003 | Sugiyama .................. 713/201 |
| 2003/0167336 | A1 * | 9/2003 | Iwamoto et al. ............ 709/229 |

FOREIGN PATENT DOCUMENTS

| JP | 08-324074 | 12/1996 |
| JP | 11-123859 | 5/1999 |
| JP | 2000-047843 | 2/2000 |
| JP | 2002-215346 | 8/2002 |
| JP | 2003-204412 | 7/2003 |
| JP | 2004-326271 | 11/2004 |

* cited by examiner

*Primary Examiner*—King Y Poon
*Assistant Examiner*—David S Cammack
(74) *Attorney, Agent, or Firm*—David G. Conlin; Steven M. Jensen; Edwards Angell Palmer & Dodge LLP

(57) ABSTRACT

An input of a user ID is accepted upon executing a copying process and the accepted user ID is transmitted to a department-management server, whereby a department ID of a department to which the user belongs is inquired. Then, in case that the department-management server receives the user ID, the department ID is searched based upon the received user ID. In case that it is determined that the corresponding department ID is present and the copying process is allowed, the department ID is replied. An image forming apparatus receiving the department ID executes the copying process, counts the number of copies and registers the number of copies as associated with the department ID.

12 Claims, 16 Drawing Sheets

FIG. 3A

| DEPARTMENT ID | NUMBER OF COPIES | NUMBER OF PRINTS |
|---|---|---|
| 9327 | 145678 | 394 |
| 6402 | 48 | 25891 |
| ⋮ | ⋮ | ⋮ |

FIG. 3B

| USER ID | NUMBER OF COPIES | NUMBER OF PRINTS |
|---|---|---|
| 1000 | 30 | 13 |
| 1001 | 151 | 205 |
| 1124 | 5 | 864 |
| ⋮ | ⋮ | ⋮ |

FIG. 5A

| DISCRIMINATION ID | DEPARTMENT NAME | DEPARTMENT ID | USER ID OF USER BELONGING TO DEPARTMENT | ... |
|---|---|---|---|---|
| 1 | GENERAL AFFAIRS DEPARTMENT | 9327 | 1000, 1124, ... | ... |
| 2 | ACCOUNTS DEPARTMENT | 6402 | 1001, 1859, ... | ... |
| 3 | SECTION I IN SALES DEPARTMENT | 7158 | 1010, 1033, ... | ... |
| 4 | SECTION II IN SALES DEPARTMENT | 0193 | 1002, 1221, ... | ... |
| ... | ... | ... | ... | ... |

FIG. 5B

| USER ID | NAME | ... |
|---|---|---|
| 1000 | ○○ TARO | ... |
| 1001 | △△ KENTA | ... |
| 1002 | ○△ HANAKO | ... |
| ... | ... | ... |

FIG. 5C

| IMAGE FORMING APPARATUS ID | APPARATUS NAME | DEPARTMENT ALLOWED TO USE | ... |
|---|---|---|---|
| 0001 | MFP1 | GENERAL AFFAIRS DEPARTMENT, ACCOUNTS DEPARTMENT | ... |
| 0002 | MFP2 | SECTION I IN SALES DEPARTMENT, SECTION II IN SALES DEPARTMENT | ... |
| ... | ... | ... | ... |

FIG. 7A

| IMAGE FORMING APPARATUS ID | DEPARTMENT ID | NUMBER OF COPIES | NUMBER OF PRINTS |
|---|---|---|---|
| 0001 | 9327 | 145678 | 394 |
| | 6402 | 48 | 25891 |
| 0002 | 7158 | 188 | 4562 |
| | 0193 | 343 | 297 |
| ⋮ | ⋮ | ⋮ | ⋮ |

FIG. 7B

| IMAGE FORMING APPARATUS ID | USER ID | NUMBER OF COPIES | NUMBER OF PRINTS |
|---|---|---|---|
| 0001 | 1000 | 30 | 13 |
| | 1001 | 151 | 205 |
| | 1124 | 5 | 864 |
| 0002 | 1002 | 30 | 13 |
| | 1010 | 151 | 205 |
| | 1033 | 5 | 864 |
| ⋮ | ⋮ | ⋮ | ⋮ |

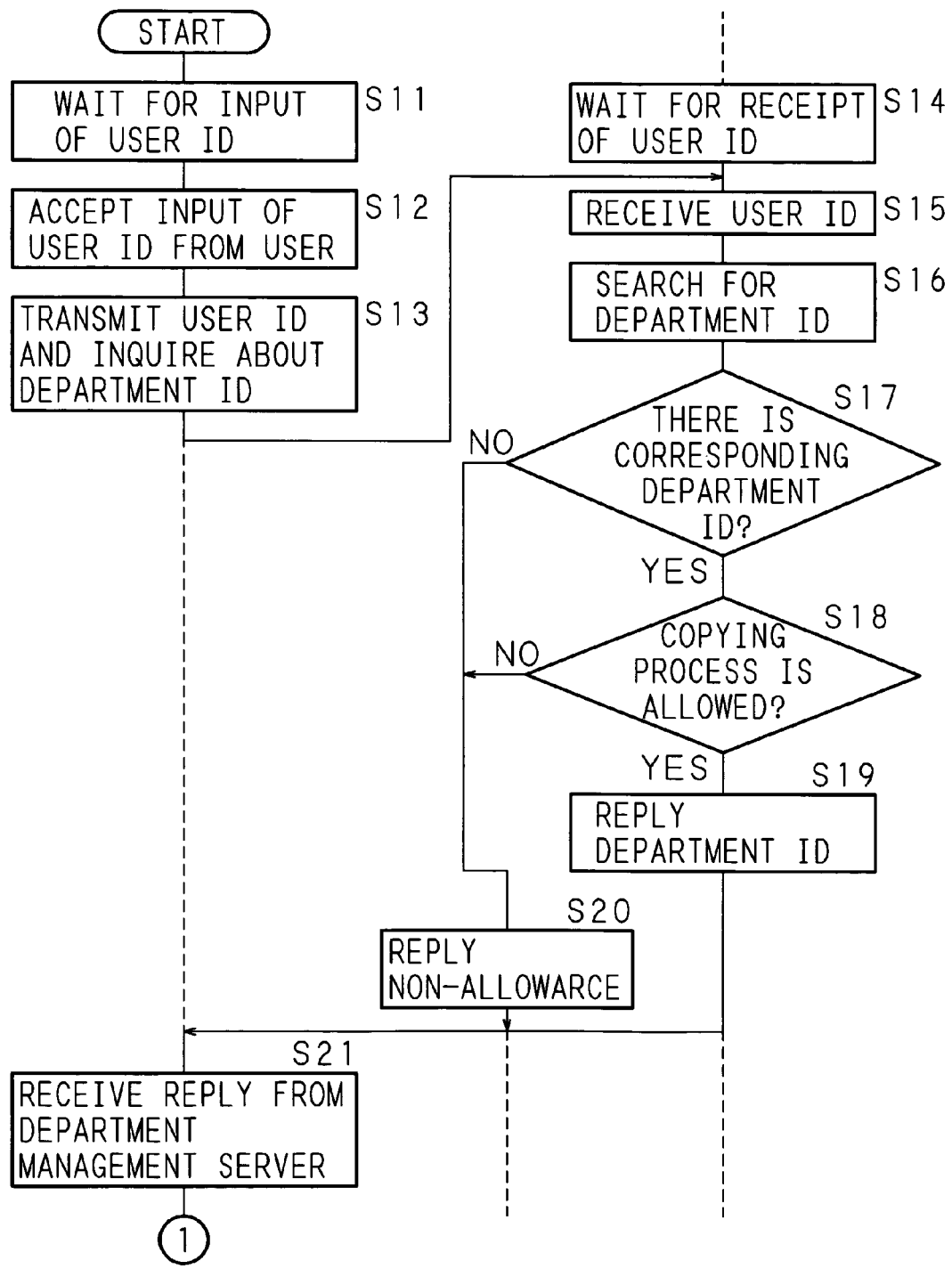

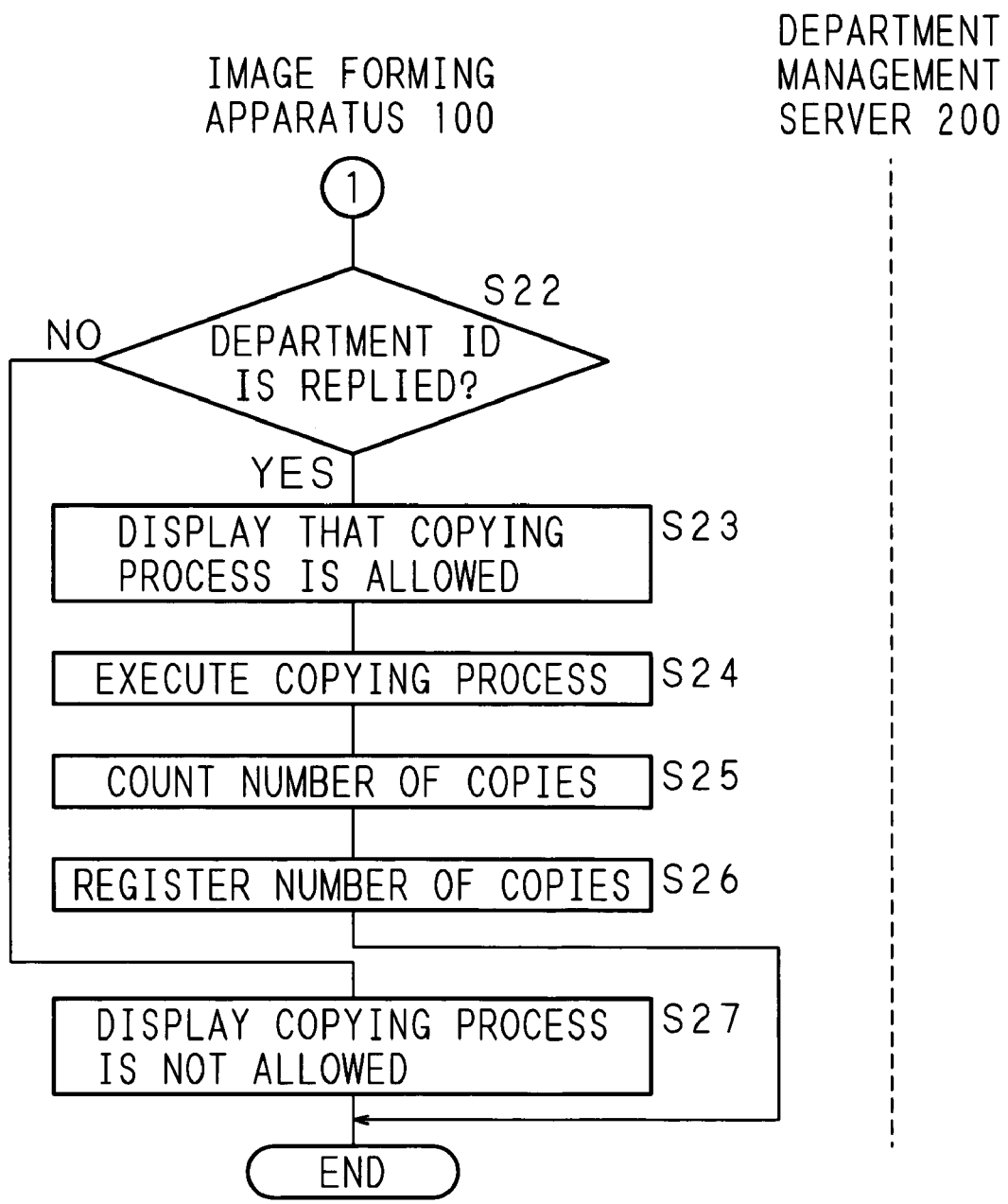

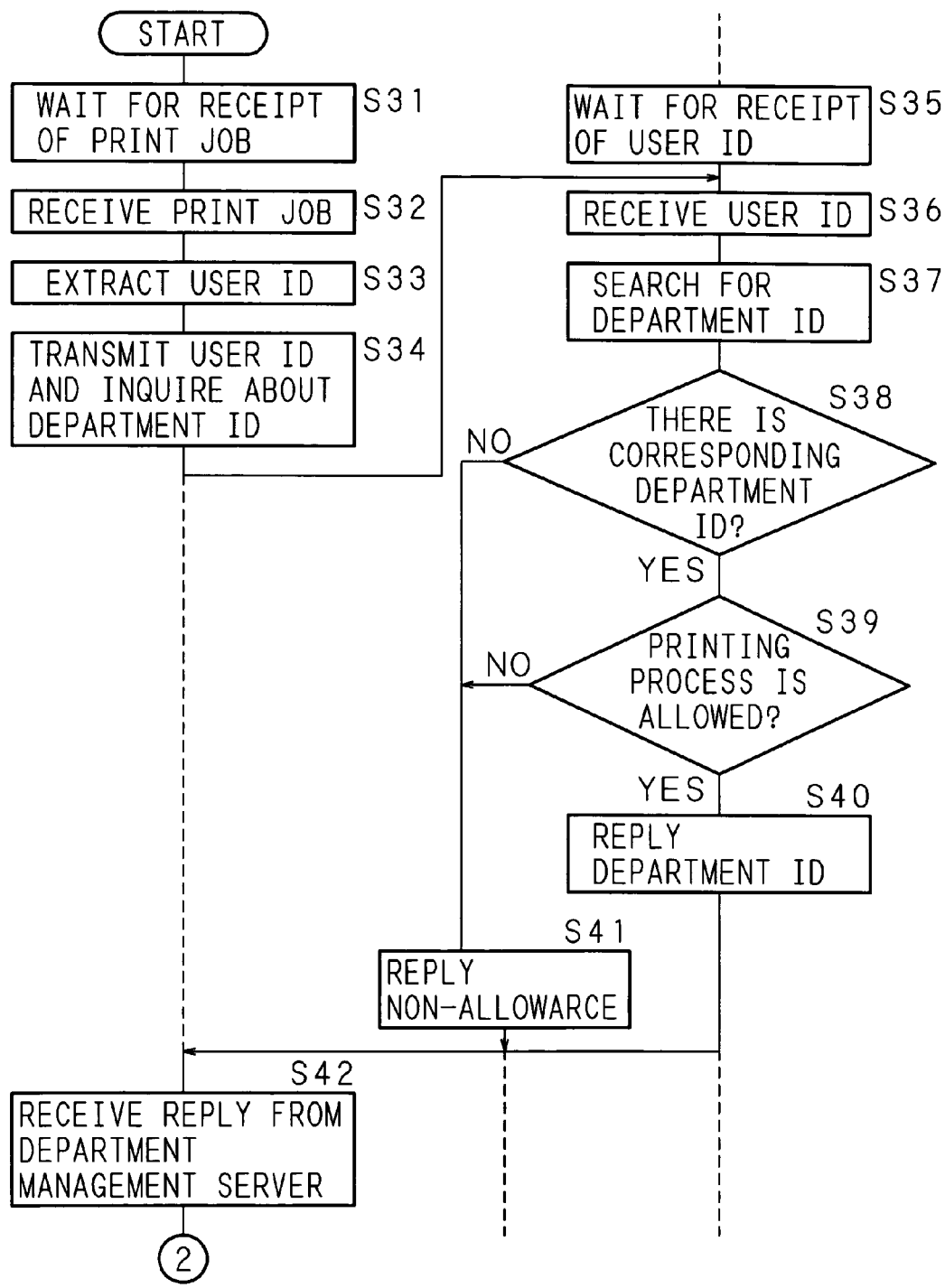

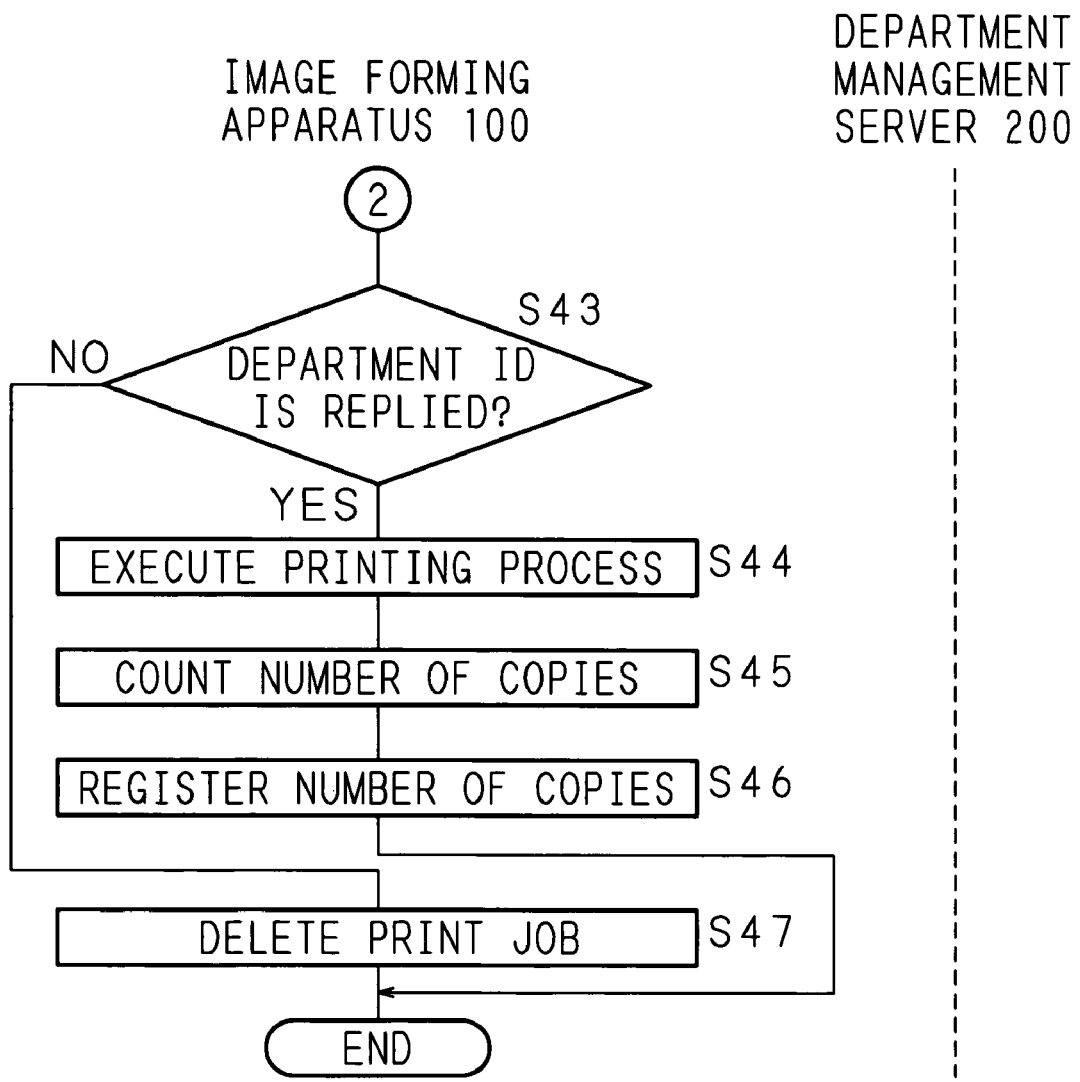

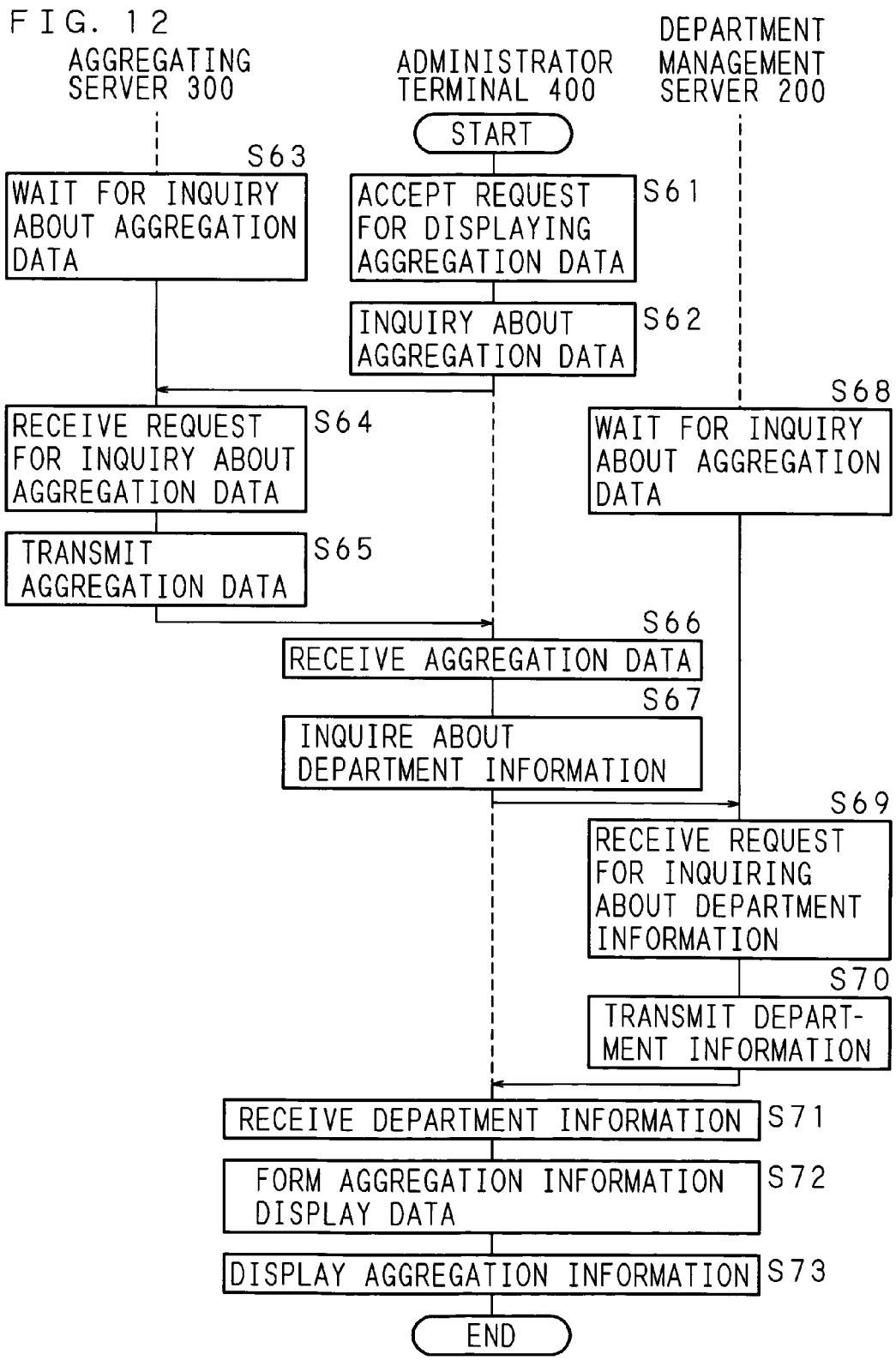

FIG. 13

| PRINT NUMBER INFORMATION | | | | |
|---|---|---|---|---|
| APPARATUS NAME:MFP1 | | | | |
| [PRINT NUMBER FOR EACH DEPARTMENT] | | | | |

| DEPARTMENT NAME | NUMBER OF COPIES | NUMBER OF PRINTS | TOTAL |
|---|---|---|---|
| GENERAL AFFAIRS DEPARTMENT | 145678 | 394 | 146072 |
| ACCOUNTS DEPARTMENT | 48 | 25891 | 25939 |
| GRAND TOTAL | 145726 | 26285 | 172011 |

[PRINT NUMBER FOR EACH USER]

| DEPARTMENT NAME | NAME | NUMBER OF COPIES | NUMBER OF PRINTS | TOTAL |
|---|---|---|---|---|
| GENERAL AFFAIRS DEPARTMENT | ○○ TARO | 30 | 13 | 43 |
| | ×× JIRO | 5 | 864 | 869 |
| | ⋮ | ⋮ | ⋮ | ⋮ |
| ACCOUNTS DEPARTMENT | △△ KENTA | 151 | 205 | 869 |
| | ⋮ | ⋮ | ⋮ | ⋮ |
| GRAND TOTAL | — | 145726 | 26285 | 172011 |

IMAGE FORMING SYSTEM WITH USER AUTHENTICATION CORRELATING USER TO DEPARTMENT FOR ACCOUNTING PURPOSES

CROSS-REFERENCE TO RELATED APPLICATION

This nonprovisional application claims priority under 35 U.S.C. §119(a) on Patent Application No. 2004-85605 filed in Japan on Mar. 23, 2004, the entire contents of which are hereby incorporated by reference.

BACKGROUND OF THE INVENTION

1. Field of the Invention

The present invention relates to an image forming system, a management apparatus, an image forming apparatus, an information processing method and a computer program, capable of managing a use state for each group or each user.

2. Description of Related Art

In an image forming apparatus such as an MFP (Multi Function Printer) capable of performing a copying process or a printing process, there has been proposed an image forming system that accepts an input of a department ID from an operation panel provided at the image forming apparatus or from a card reader for a magnetic card or the like upon copying to manage the number of copies for each department, and that gives the department ID to print data from a terminal of a user upon printing to manage the number of prints for each department, whereby the number of copies and the number of prints are collectively managed for each department.

Further, a technique has been proposed wherein a department management for the number of copies is performed by key-inputting a department ID to an input unit provided at the image forming apparatus upon copying and a department management for the number of prints is performed by converting a user ID given to the data transmitted from a PC into a department ID by using a user ID-department ID conversion table provided in a print server upon printing (see, for example, Japanese Patent Application Laid-Open No. 11-123859 (1999)). Moreover, an aggregating server has been proposed that collects data of the number of prints for each department accumulated at each image forming apparatus to perform a collectively management.

However, in a conventional management technique for managing the number of copies and the number of prints with the department ID, the user is required to memorize the department ID and input the department ID before performing the copying process or printing process. Further, in case that the user erroneously memorizes the department ID, there is a case that the number of copies and the number of prints are mistakenly stored into a department different from the department to which the user belongs. Moreover, in case that the user is assigned to another department, it is necessary to register again a department ID of newly assigned department. Furthermore, it is necessary to register a department ID for each image forming apparatus in an environment of plural image forming apparatuses.

Moreover, in the image forming system disclosed in Japanese Patent Application Laid-Open No. 11-123859 (1999), the department management relating to the printing process is performed with the user ID but the department management relating to the copying process is performed with the conventional department ID, so that the user is still required to memorize the department ID number of the department to which the user belongs, thereby entailing a problem same as that of the conventional technique of managing the number of copies and the number of prints with the department ID.

Additionally, in the aggregating server which collects the data of the number of prints for each department accumulated in each image forming apparatus and performs a collectively management, the totalizing server collects the data of the number of prints for each department, or when the user obtains the aggregation data of the number of prints from the aggregating server for displaying the data of the number of prints, a furtive glance of the data makes it possible to infer which department performs how much printing. Further, the conventional department ID is often allocated by an administrator or the like, therefore the relationship among departments may appear in the manner of allocating the department ID number. For example, in case that "1001" is allocated to the section I in the accounts department as the department ID, "1002" is allocated to the section II in the accounts department as the department ID, whereby the relationship among the departments from the department ID may be inferred. Therefore, it becomes possible to infer which department performs how much printing, thereby entailing a problem that there is a fear of information leakage.

BRIEF SUMMARY OF THE INVENTION

The present invention has been made with the aim of solving the above problem, and it is an object of the present invention to provide an image forming system, a management apparatus, an image forming apparatus, an information processing method and a computer program having a configuration that a management apparatus is provided with storing means for storing user information and group information to which each user belongs as associated with each other, and when the user information is received from an information apparatus externally connected to an image forming apparatus or the like, the group information associated with the received user information is searched and transmitted to the information apparatus. With this configuration, the use state for each group can be managed without the need that each user memorizes the information of the group to which the user belongs.

Another object of the present invention is to provide an image forming apparatus and a management apparatus capable of preventing the image forming state for each group and the relationship among groups from being inferred from the group information when the information of the number of prints is obtained from each image forming apparatus, by a configuration that the group information stored in the management apparatus is set by a random number.

An image forming system according to the present invention is an image forming system comprising an image forming apparatus that accepts a job for instructing an image formation and executes the image formation on a sheet based upon the accepted job, and a management apparatus that is connected to the image forming apparatus and manages user information relating to a user of the image forming apparatus, wherein, the image forming apparatus comprises means for accepting the user information relating to the user when accepting the job for instructing the image formation, and means for transmitting the accepted user information to the management apparatus, the management apparatus comprises storing means for storing plural pieces of user information and group information of a group to which each user belongs, the group information being associated with each of the user information, means for receiving the user information transmitted from the image forming apparatus, search means for searching for the group information associated with the received user information from the storing means, and means for transmitting the group information searched by the search means to the image forming apparatus, and the image forming apparatus executes the image formation when receiving the group information transmitted from the management apparatus.

According to the present invention, the management apparatus comprises storing means for storing the user information and the group information of the group to which each user belongs as associated with each other. Upon receiving the user information from the image forming apparatus, the management apparatus searches for the group information associated with the received user information and transmits the resultant to the image forming apparatus. Upon receiving the group information transmitted from the management apparatus, the image forming apparatus executes the image formation. Therefore, the image forming apparatus does not need to manage association of the user information with the group information, whereby, even in case that plural image forming apparatuses are connected, a collectively management by the management apparatus is possible. Further, even in case that the use state of the image forming apparatus is managed for each group, the user has no need to input the information of the group to which the user belongs, and moreover, the confusion in the information management involved with the erroneous input of the group information is avoided.

The image forming system according to the present invention is characterized in that the management apparatus further comprises means for storing information as to whether the image formation determined for each group is allowed or not, determining means for determining whether the image formation is allowed or not based upon the group information searched by the search means, and means for stopping the transmission of the group information when the determining means determines that the image formation is not allowed to be executed.

According to the present invention, the management apparatus stores the information as to whether the image formation determined for each group is allowed or not and the image formation is determined to be allowed or not based upon the group information searched when the user information is received, whereby the use of the image forming apparatus by a user not registered in advance is excluded.

The image forming system according to the present invention is characterized in that the management apparatus comprises means for notifying the image forming apparatus that the image formation is not allowed, when the determining means determines that the image formation is not allowed.

According to the present invention, in case of determining that the image formation is not allowed, the management apparatus notifies the image forming apparatus of this determination, whereby a fact that the image forming apparatus is not allowed to be used is informed to a user who erroneously inputs the user information or a user who intends to do an improper use.

The image forming system according to the present invention is characterized in that the job accepted by the image forming apparatus includes the user information, and the image forming apparatus comprises means for extracting the user information from the job.

According to the present invention, provided is means for extracting the user information from the accepted job. Therefore, by including the user information into the print job, the use state for each group can be managed without a need that the user directly inputs the user information to the image forming apparatus.

The image forming system according to the present invention is characterized in that the image forming apparatus further comprises means for counting the number of image formation for each group.

According to the present invention, the image forming apparatus comprises means for counting the number of image formation for each group, whereby the number of image formation for each group can be managed based upon the accepted user information.

The image forming system according to the present invention is characterized in that the image forming apparatus comprises means for transmitting the number information relating to the counted image formation number for each group to the management apparatus, and the management apparatus comprises means for receiving the number information transmitted from the image forming apparatus, and means for displaying the received number information as associated with each group.

According to the present invention, the counted number information for each group is transmitted to the management apparatus and the number information is displayed at the management apparatus as associated with each group, whereby an authoritative administrator can inspect the use state for each group of the image forming apparatus and the aggregation data.

The image forming system according to the present invention is characterized in that plural image forming apparatuses are provided, and an aggregating device that aggregates the number information relating to the number of image formation of each group counted by each image forming apparatus is connected to the image forming apparatus.

According to the present invention, provided is the aggregating device for aggregating the number information for each group from the plural image forming apparatuses, whereby the use state for each group of each image forming apparatus and the aggregation data can be collectively managed.

The image forming system according to the present invention is characterized in that the aggregating device comprises means for transmitting the aggregated number information to the management apparatus, and the management apparatus comprises means for receiving the number information transmitted from the aggregating device, and means for displaying the received number information as associated with each group.

According to the present invention, the aggregated number information is transmitted to the management apparatus and the number information is displayed at the management apparatus as associated with each group, whereby an authoritative administrator can inspect the use state for each group of the image forming apparatus and the aggregation data.

The image forming system according to the present invention is characterized by further comprising a display device for displaying the number information aggregated by the aggregating device, wherein the aggregating device comprises means for transmitting the aggregated number information to the display device, and the display device comprises means for receiving the number information transmitted from the aggregating device, and means for displaying the received number information as associated with each group.

According to the present invention, the aggregated number information is transmitted to the display device and the number information is displayed at the display device as associated with each group, whereby an authoritative administrator can inspect the use state for each group in each of the image forming apparatuses and the aggregated data.

The image forming system according to the present invention is characterized in that the management apparatus comprises means for generating a random number, and means for generating the group information to be stored in the storing means based upon the random number generated by the above means.

According to the present invention, the management apparatus generates a random number and the generated random number is stored in the storing means as the group information, whereby, even in case that the group information is transmitted/received on a communication network or the total of the use state for each group is consigned to the outside, it becomes difficult to infer the group name or the relationship among groups from the group information, thereby being capable of improving confidentiality.

The image forming system according to the present invention is characterized in that the display device further comprises means for generating a random number in synchronism with the management apparatus.

According to the present invention, the display device can generate the random number synchronous with the management apparatus, thereby making it possible to decode the group information registered by the random number. Accordingly, it becomes possible to display the use state and aggregated data so as to associate with the original group name.

A management apparatus according to the present invention is a management apparatus that has an information apparatus being capable of being connected thereto and manages user information relating to a user of the connected information apparatus, comprising storing means for storing plural pieces of user information and group information relating to a group to which each user belongs and associated with each of the user information, means including the user information and for receiving a search request to the group information from the outside, search means for searching for the group information associated with the user information from the storing means in accordance with the received search request, and means for transmitting the group information searched by the search means to the request source of the search request.

According to the present invention, provided is the storing means for storing the user information and the group information of the group to which each user belongs as associated with each other. In case that the user information is received from the external information apparatus, the group information associated with the received user information is searched to be transmitted to the information apparatus. Therefore, association of the user information with the group information is not required to be managed in the information apparatus. Even in case that plural information apparatuses are connected, the user information and the group information can collectively be managed. Further, even in case that the use state of the information apparatus is managed for each group, the user has no need to input the information of the group to which the user belongs, and moreover, the confusion in the information management involved with the erroneous input of the group information is avoided.

The management apparatus according to the present invention is characterized by further comprising means for storing information as to whether the use of the information apparatus determined for each group is allowed or not, determining means for determining whether the use of the information apparatus is allowed or not based upon the group information searched by the search means, and means for stopping the transmission of the group information when the determining means determines that the use is not allowed.

According to the present invention, the information as to whether the image formation determined for each group is allowed or not is stored and it is determined whether the use of the information apparatus is allowed or not based upon the group information searched upon the receipt of the user information, thereby excluding the use of the information apparatus by a user not registered in advance.

An image forming apparatus according to the present invention is an image forming apparatus that accepts a job for instructing an image formation and executes the image formation on a sheet based upon the accepted job, comprising means for storing plural pieces of user information and group information of a group to which each user belongs and associated with each of the user information, means for storing information as to whether an image formation determined for each group is allowed or not, means for accepting the user information relating to a user upon accepting the job for instructing the image formation, means for searching for the group information associated with the accepted user information, and means for determining whether the image formation is allowed or not based upon the group information searched by the above means.

According to the present invention, provided is the storing means for storing the user information and group information of a group to which each user belongs as associated with each other. In case that the user information is accepted, the group information associated with the accepted user information is searched to determine whether the image formation is allowed or not based upon the searched group information. Therefore, even in case that the use state is managed for each group, the user has no need to input the information of the group to which the user belongs, and moreover, the confusion in the information management involved with the erroneous input of the group information is avoided.

An information processing method according to the present invention is an information processing method comprising a step of searching for group information from storing means for storing plural pieces of user information and group information associated with each of the user information based upon the user information of an information apparatus externally accepted, and a step of determining whether the use of the information apparatus is allowed or not based upon the searched group information.

According to present invention, the user information and group information of a group to which each user belongs are stored as associated with each other, and in case that the user information is accepted, the group information associated with the accepted user information is searched to determine whether the use of the information apparatus is allowed or not based upon the searched group information. Therefore, even in case that the use state is managed for each group, the user has no need to input the information of the group to which the user belongs, and moreover, the confusion in the information management involved with the erroneous input of the group information is avoided.

A computer program according to the present invention is a computer program comprising a step of causing a computer to search for group information from storing means for storing plural pieces of user information and group information associated with each of the user information based upon the inputted user information of an information apparatus, and a step of causing the computer to determine whether the use of the information apparatus is allowed or not based upon the group information that is caused to be searched.

According to the present invention, the user information and group information of a group to which each user belongs are stored as associated with each other, and in case that the user information is accepted, the group information associated with the accepted user information is searched to determine whether the use of the information apparatus is allowed or not based upon the searched group information. Therefore, even in case that the use state is managed for each group, the user has no need to input the information of the group to which the user belongs, and moreover, the confusion in the information management involved with the erroneous input of the group information is avoided.

According to the present invention, the management apparatus comprises storing means for storing the user information and the group information of the group to which each user belongs as associated with each other. Upon receiving the user information from the image forming apparatus, the management apparatus searches for the group information associated with the received user information and transmits the resultant to the image forming apparatus. Upon receiving the group information transmitted from the management apparatus, the image forming apparatus executes the image formation. Therefore, the image forming apparatus does not need to manage association of the user information with the group information, whereby, even in case that plural image forming apparatuses are connected, a collectively management by the management apparatus is possible. Further, even in case that the use state of the image forming apparatus is managed for each group, the user has no need to input the information of the group to which the user belongs, and moreover, the confusion in the information management involved with the erroneous input of the group information is avoided.

According to the present invention, the management apparatus stores the information relating to whether the image formation determined for each group is allowed or not and the image formation is determined to be allowed or not based upon the group information searched when the user information is received, whereby the use of the image forming apparatus by a user not registered in advance is excluded.

According to the present invention, in case of determining that the image formation is not allowed, the management apparatus notifies the image forming apparatus of this determination, whereby a fact that the image forming apparatus is not allowed to be used is informed to a user who erroneously inputs the user information or a user who intends to do an improper use.

According to the present invention, provided is the means for extracting the user information from the accepted job. Therefore, by including the user information into the print job, the use state for each group can be managed without a need that the user directly inputs the user information to the image forming apparatus.

According to the present invention, the image forming apparatus comprises means for counting the number of image formation for each group, whereby the number of image formation for each group can be managed based upon the received user information.

According to the present invention, the counted number information for each group is transmitted to the management apparatus and the number information is displayed at the management apparatus as associated with each group, whereby an authoritative administrator can inspect the use state for each group of the image forming apparatus and the aggregation data.

According to the present invention, provided is an aggregating device for aggregating the number information for each group from plural image forming apparatuses, whereby the use state for each group of each image forming apparatus and the aggregation data can be collectively managed.

According to the present invention, the aggregated number information is transmitted to the management apparatus and the number information is displayed at the management apparatus as associated with each group, whereby an authoritative administrator can inspect the use state for each group of the image forming apparatus and the aggregation data.

According to the present invention, the aggregated number information is transmitted to the display device and the number information is displayed at the display device as associated with each group, whereby an authoritative administrator can inspect the use state for each group in each of the image forming apparatus and the aggregation data.

According to the present invention, the management apparatus generates a random number and the generated random number is stored in the storing means as the group information, whereby, even in case that the group information is transmitted/received on a communication network or the total of the use state for each group is consigned to the outside, it becomes difficult to infer the group name or the relationship among groups from the group information, thereby being capable of improving confidentiality.

According to the present invention, the display device can generate the random number synchronous with the management apparatus, thereby making it possible to decode the group information registered by the random number. Accordingly, it becomes possible to display the use state and aggregation data so as to associate with the original group name.

According to the present invention, provided is the storing means for storing the user information and the group information of the group to which each user belongs as associated with each other. In case that the user information is received from the external information apparatus, the group information associated with the received user information is searched to be transmitted to the information apparatus. Therefore, association of the user information with the group information is not required to be managed in the information apparatus. Even in case that plural information apparatuses are connected, the user information and the group information can collectively be managed. Further, even in case that the use state of the information apparatus is managed for each group, the user has no need to input the information of the group to which the user belongs, and moreover, the confusion in the information management involved with the erroneous input of the group information is avoided.

According to the present invention, the information as to whether the image formation determined for each group is allowed or not is stored and it is determined whether the use of the information apparatus is allowed or not based upon the group information searched upon the receipt of the user information, thereby excluding the use of the information apparatus by a user not registered in advance.

According to the present invention, provided is the storing means for storing the user information and group information of a group to which each user belongs as associated with each other. In case that the user information is accepted, the group information associated with the accepted user information is searched to determine whether the image formation is allowed or not based upon the searched group information. Therefore, even in case that the use state is managed for each group, the user has no need to input the information of the group to which the user belongs, and moreover, the confusion in the information management involved with the erroneous input of the group information is avoided.

The above and further objects and features of the present invention will more fully be apparent from the following detailed description with accompanying drawings.

BRIEF DESCRIPTION OF THE SEVERAL VIEWS OF THE DRAWINGS

FIGS. 3A and 3B are conceptual views showing one example of database of the number of prints provided at the image forming apparatus;

FIGS. 5A, 5B and 5C are conceptual views showing one example of a department ID management table;

FIGS. 7A and 7B are conceptual views showing one example of a print number aggregation database;

FIGS. 9A and 9B are flowcharts for describing a procedure when the image forming apparatus executes a copying process;

FIGS. 10A and 10B are flowcharts for describing a procedure when the image forming apparatus executes a printing process;

FIG. 12 is a flowchart for describing a procedure for displaying aggregation information on the administrator terminal; and FIG. 13 is a schematic view showing one example of the aggregation information displayed on the administrator terminal.

DETAILED DESCRIPTION OF THE INVENTION

The following description will explain the present invention, based on the drawings illustrating an embodiment thereof.

Figure 1:
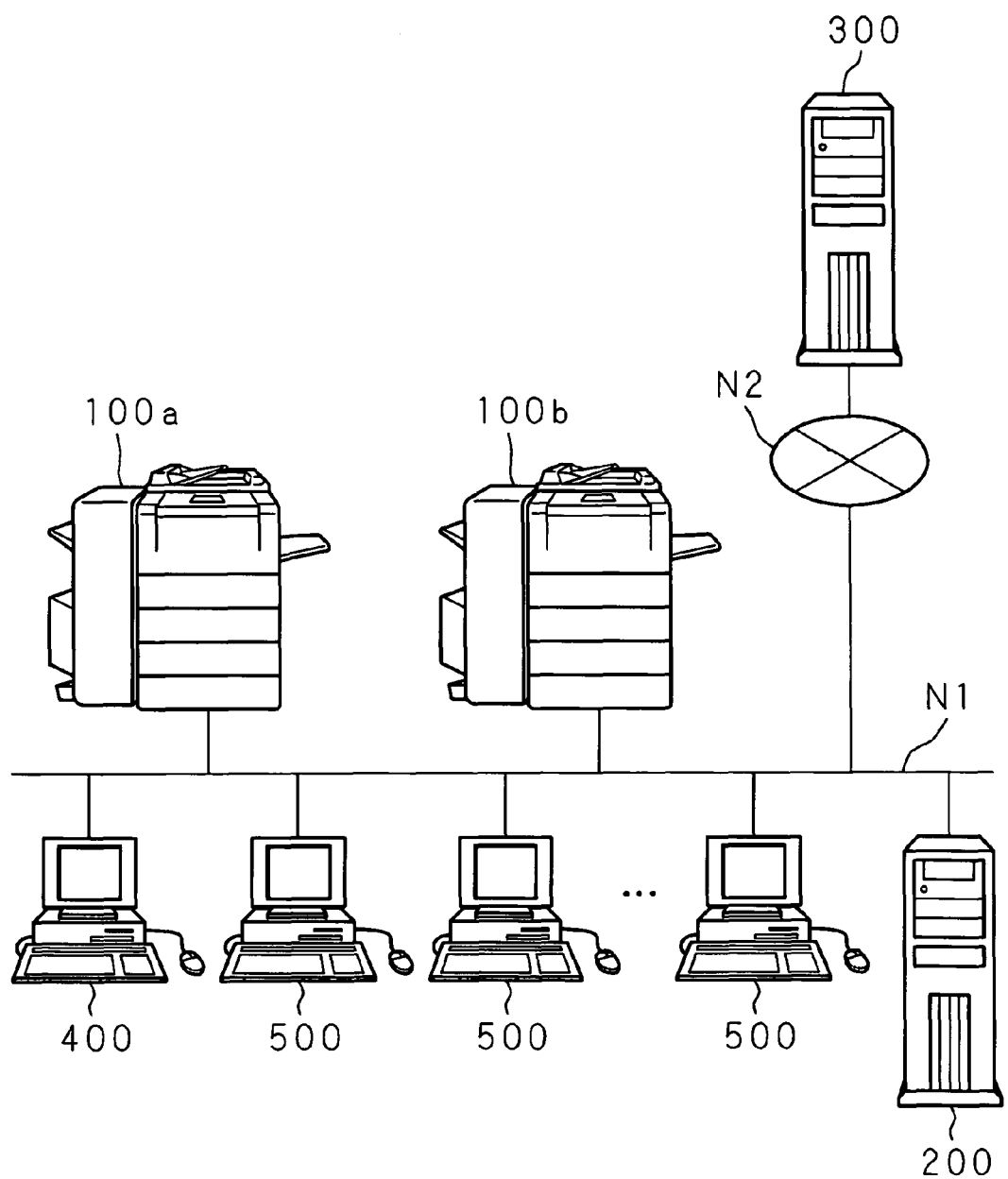
FIG. 1 is a schematic view showing an entire configuration of an image forming system according to an embodiment of the present invention.

FIG. 1 is a schematic view showing an entire configuration of an image forming system according to this embodiment. In FIG. 1, the reference numeral 100a, 100b denote image forming apparatuses which function as a scanner reading an image onto a document, a copying machine performing an image formation on a sheet such as a paper, an OHP film based upon image data acquired by reading the image onto the document and a printing machine performing an image formation onto a sheet based upon a print job externally transmitted. Connected to the image forming apparatuses 100a, 100b are an administrator terminal 400 for an administrator and user terminals 500, 500, . . . , 500 for users through a communication network N1. The administrator terminal 400 and the user terminal 500 are specifically personal computers having pre-installed therein a driver program (printer driver) for utilizing the image forming apparatuses 100a, 100b via the communication network N1. Herein, the printer driver generates a print job that is then transmitted to the image forming apparatus 100a (or image forming apparatus 100b) via the communication network N1, thereby being capable of executing a printing process.

Further, connected to the communication network N1 is a department-management server 200 that manages information of departments sharing the communication network N1. The department-management server 200 manages information of users belonging to each department and sets the department that is allowed to use the image forming apparatus for each image forming apparatus 100a, 100b. Further, the communication network N1 is connected to a wide-area communication network N2, whereby information can be transmitted to/received from a terminal (not shown) on a communication network provided for other department via the communication network N2. An aggregating server 300 is connected to the communication network N2 for counting a total number of prints for each department and each user with respect to the image forming apparatuses 100a, 100b.

Hereinafter, each device in the image forming system will be described in detail.

Figure 2:
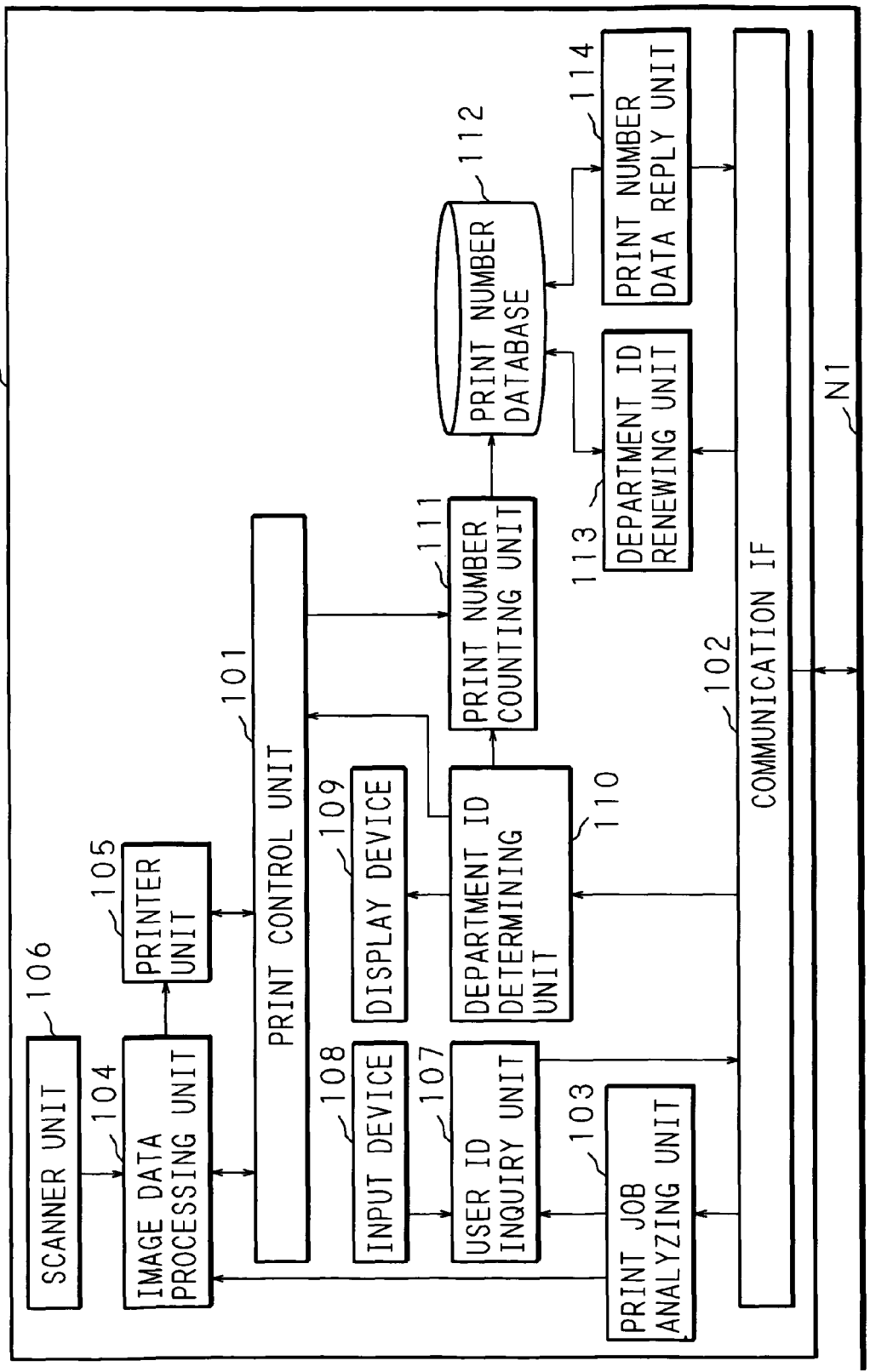
FIG. 2 is a block diagram showing an internal configuration of an image forming apparatus.

FIG. 2 is a block diagram showing an internal configuration of the image forming apparatus 100a. The image forming apparatus 100a comprises a print control unit 101, a communication IF (accepting unit, transmitting unit) 102, a print job analyzing unit (extracting unit) 103, an image data processing unit 104, a printer unit 105, a scanner unit, a user ID inquiry unit 107, an input device (accepting unit) 108, a display device 109, a department ID determining unit (search unit, determining unit) 110, a print number counting unit (counting unit) 111, a print number database (storing unit) 112, a department ID renewing unit 113 and a print number data reply unit 114. The image forming apparatus 100a executes a printing process based upon the print job received through the communication IF 102 and, also, executes a copying process based upon the image data inputted through the scanner unit 106, by the control of the print control unit 101.

The print control unit 101 is configured by a CPU and performs a control of general printing function by controlling the operation of each of the above-mentioned various kinds of hardware. The control executed by the print control unit 101 includes a control for transmitting the image data developed from the print job received through the communication IF 102 and the image data acquired by the scanner unit 106 to the printer unit 105 via the image data processing unit 104, a control of the printer unit 105 executed for forming an image onto a sheet, and the like. Further, in this embodiment, the print control unit 101 executes a control for allowing the printing based upon the result of the department ID determining unit 110, and, also, counts the number of prints upon the printing to notify the print number counting unit 111 of the department ID given to the department executing the printing and the information of the number of prints.

The communication IF 102 comprises an interface in accordance with the communication standard of the communication network N1. The communication IF 102 receives a print job or various kinds of data from the terminal and the department-management server 200 connected to the communication network N1 and various kinds of data from the aggregating server 300 connected to the communication network N2 and, also, transmits necessary data to the terminal or server. The communication IF 102 controls transmission/reception of data described above.

The print job analyzing unit 103 analyzes the print job received through the communication IF 102, thereby extracting the user ID given at the user terminal 500 that transmits the print job and developing the image information described with a page description language into image data. The extracted user ID is sent to the user ID inquiry unit 107, while the developed image data is sent to the image data processing unit 104.

The scanner unit 106 comprises a light source that irradiates light on a document to be read, an image sensor such as a CCD (Charge Coupling Device) and an A/D converter (all of which are not shown). Herein, the image on the document set at the predetermined reading position is formed by the image sensor, the resultant is converted into an analog electrical signal, and then, the obtained analog electrical signal is converted into a digital signal by the A/D converter. Then, a correction such as light distribution characteristic of the light source or non-uniform sensitivity of the image sensor upon reading the document is made to the digital signal obtained by the A/D conversion, thereby forming digital image data. The image data formed at the scanner unit 106 is sent to the image data processing unit 104.

The image data processing unit 104 has an image memory temporarily holding the image data sent from the print job analyzing unit 103 or scanner unit 106, and sends the held image data to the printer unit 105 at the timing instructed by the print control unit 101. The printer unit 105 comprises, for example, a charger for charging a photosensitive drum at a predetermined potential, a laser writing device that emits a laser beam according to the image data inputted through the image data processing unit 104 to form an electrostatic latent image on the photosensitive drum, a developing unit that supplies a toner to the electrostatic latent image formed on the surface of the photosensitive drum to make the electrostatic latent image visible, and a transfer device for transferring the toner image formed onto the surface of the photosensitive drum onto a sheet (all of which are not shown), whereby the image designated by the print job is formed on a sheet with an electrophotographic method. Although the printer unit 105 has a configuration of performing an image formation with an electrophotographic method using the laser writing device in this embodiment, a configuration is of course possible which has a printer unit provided with an ink jet method, a thermal transfer method, a sublimation method or the like.

The input device 108 is configured by an operation unit that accepts an operation instruction from a user such as a set value relating to a printing process such as the number of prints or print density and an instruction for starting to read the document, and an information read unit that reads predetermined information from an IC card. In this embodiment, user information (user ID) is given in advance to each user, so that the user ID is read from an IC card on which a user ID of each user is recorded, thereby performing an identification of the user. When a request for process such as a copying process is accepted by the image forming apparatus 100a, a fact that an IC card is necessary is displayed on the display device 109 such as a liquid crystal display to prompt the user to input the user ID. In this way, the user ID read by the information read unit is sent to the user ID inquiry unit 107.

Although this embodiment has a configuration that the user ID is read from the IC card, it is needless to say that the recording medium for holding the user ID is not limited to the IC card. For example, a magnetic card may be used instead of the IC card, or a portable memory such as a USB memory may be used. Further, a configuration is possible that the user ID is acquired by wireless communication, infrared communication, Bluetooth or the like. In this case, examples of the recording medium holding the user ID include communication apparatuses such as a mobile telephone, a PDA (Personal Digital Assistant), a wireless tag and the like, whereby the individual user ID can be acquired by providing a receiver to the image forming apparatus 100a for receiving the data transmitted from the communication apparatus. Further, a configuration is possible that the user oneself directly inputs the user ID through the input device 108 provided at the image forming apparatus 100a.

The user ID inquiry unit 107 transmits the user ID sent from the print job analyzing unit 103 or the input device 108 to the department-management server 200 via the communication IF 102 to make an inquiry about the department to which the user having the given user ID belongs. The inquired result is informed by the department-management server 200 via the communication network N1. The department ID determining unit 110 determines whether the printing process is allowed or not in response to the inquired result given from the department-management server 200. Specifically, as described below, in case that the department ID is replied from the department-management server 200 as a result of requesting the inquiry, the department ID determining unit 110 determines that the printing process is allowed, while in case that the department ID is not replied, the department ID determining unit 110 determines that the printing process is not allowed. The determination result by the department ID determining unit 110 is sent to the print control unit 101, whereby the printing process is executed if the printing is allowed. On the other hand, if the printing is not allowed, a fact that the printing is not allowed is displayed on the display device 109.

The print number counting unit 111 sends the information of the number of prints counted by the print control unit 101 to the print number database 112 with the user ID and the department ID after the printing process is completed. The print number database 112 manages the information of the number of prints for each department and the number of prints for each user. FIGS. 3A and 3B are conceptual views showing one example of the print number database 112 provided at the image forming apparatus 100a. The print number database 112 is constructed of print number aggregation data for each department shown in FIG. 3A and print number aggregation data for each user shown in FIG. 3B. In this example, four-digit integer is given as the department ID, and the number of copies and the number of prints are aggregated for each department ID. Further, four-digit integer is also given to the user ID, and the number of copies and the number of prints are aggregated for each user ID. The user ID is a number that is determined beforehand by an administrator or the like and is unique to the user. The department ID is regularly generated by the department-management server 200 at random, and the department ID renewing unit 113 receives the generated department ID via the communication network N1 for renewing the department ID in the print number database 112. Further, the image forming apparatus 100a can transmit the information of the number of prints aggregated in the print number database 112 according to the request from the aggregating server 300. In case of accepting the request, the print number data reply unit 114 extracts the corresponding information from the print number database 112 to reply the information to the aggregating server 300.

It should be noted that the internal configuration of the image forming apparatus 100b is the same as that of the image forming apparatus 100a. In case that it is unnecessary to make a distinction between both image forming apparatuses, the description is only made as the image forming apparatus 100 hereinafter.

Figure 4:
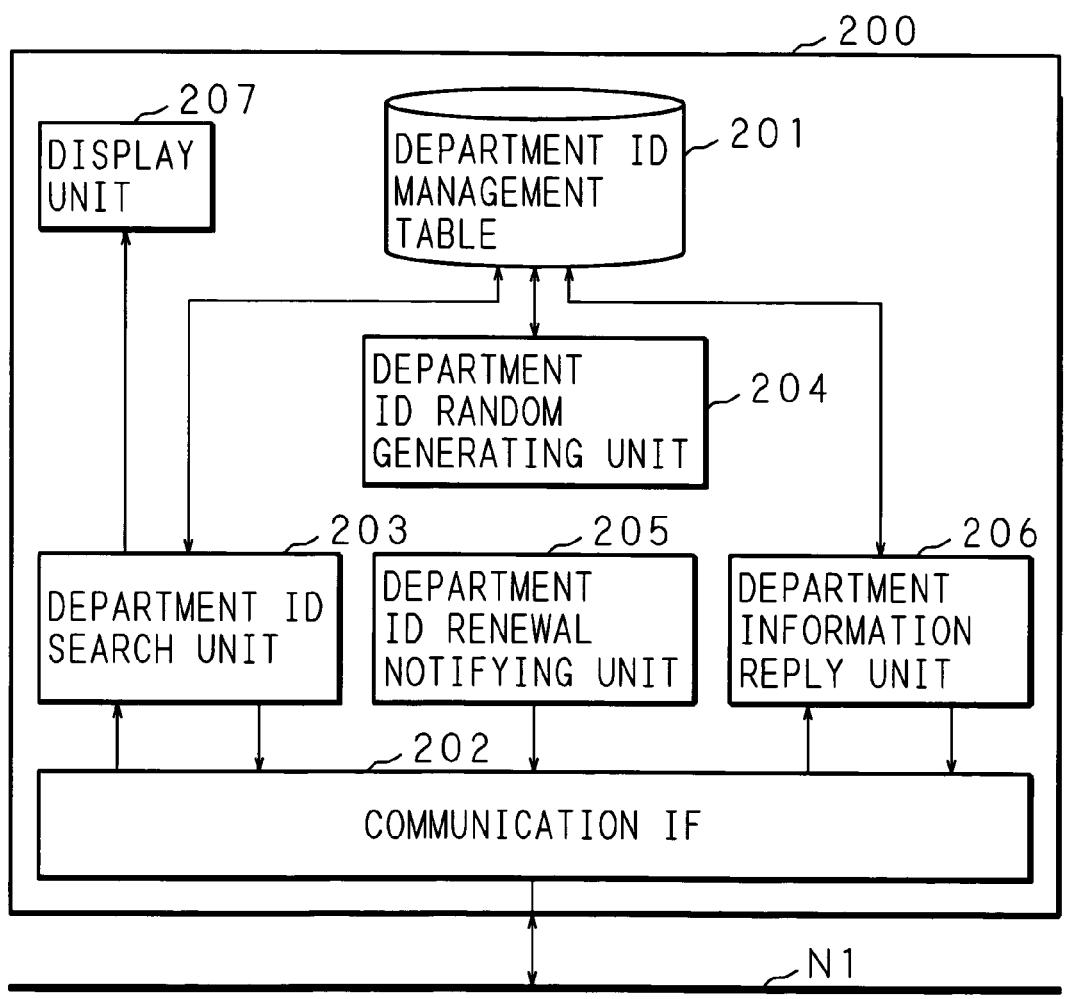
FIG. 4 is a block diagram showing an internal configuration of a department-management server.

FIG. 4 is a block diagram showing an internal configuration of the department-management server 200. The department-management server 200 comprises a department ID management table (storing unit) 201, a communication IF (receiving unit, transmitting unit, notifying unit) 202, a department ID search unit (search unit, determining unit, stop unit) 203, a department ID random generating unit (generating unit) 204, a department ID renewal notifying unit 205, a department information reply unit 206, and a display unit 207. The department-management server 200 performs a management of the department ID of each department, a management of the user ID of a user belonging to each department, and a setting of the department that is allowed to use the image forming apparatus for each image forming apparatus (100a, 100b).

In the department ID management table 201, a department ID of each department, a user ID of a user belonging to each department, and information as to whether the image forming apparatus is allowed to be used for each image forming apparatus are registered. FIGS. 5A, 5B and 5C are conceptual views showing one example of the department ID management table 201. The department ID management table 201 is configured by a department table shown in FIG. 5A, a user table shown in FIG. 5B and an image forming apparatus table shown in FIG. 5C. The department table stores the department name of each department, a department ID and a user ID of a user belonging to each department as associated with one another. In the example shown in FIG. 5A, for example, "9327" is given to the "general affairs department" as the department ID, and "1000", "1124", . . . are registered as user IDs of users belonging to the "general affairs department". The same manner is applied to the other departments ("accounts department", "section I in sales department", "section II in sales department", . . . ). The user table provides the one-to-one correspondence between the name of each user and the user ID. The example shown in FIG. 5B shows that the names of the users to whom "1000", "1001 and "1002" are given are "* Taro", "* Kenta", "*** Hanako" respectively. The image forming apparatus table stores the image forming apparatus ID given for each image forming apparatus (100a, 100b), the device name, and the department that is allowed to use the image forming apparatus for each image forming apparatus (100a, 100b), each of which is associated with one another. The example shown in FIG. 5C shows that the name of the image forming apparatus (e.g., the image forming apparatus 100a) to which "0001" is given as the ID of the image forming apparatus is "MFP1" and the "general affairs department" and the "accounts department" are set as the department that is allowed to use the image forming apparatus. The same manner is applied to the image forming apparatus (e.g., the image forming apparatus 100b) to which "0002" is given as the ID of the image forming apparatus.

The communication IF 202 comprises an interface according to the communication standard of the communication network N1, and is configured to receive a request from the image forming apparatus 100 and the administrator terminal 400 connected to the communication network N1 and a request from the aggregating server 300 connected to the communication network N2 and transmit the necessary data.

When accepting the inquiry from the image forming apparatus 100, the department ID search unit 203 searches for the department ID from the department ID management table 201 with the user ID as a key, and transmits the search result to the image forming apparatus 100 that is an inquirer. The department ID random generating unit 204 regularly generates the department ID at random and sets the resultant as the department ID in the department table shown in FIG. 5A. Further, in case that the department ID is newly generated at the department ID random generating unit 204, the department ID renewal notifying unit 205 notifies the image forming apparatus 100 and the aggregating server 300 of this fact to make an instruction of renewal. When accepting the transmission request of the department information from the administrator terminal 400, the department information reply unit 206 extracts the corresponding information from the department ID management table 201 and replies the resultant to the administrator terminal 400. The display unit 207 displays the number information so as to associate with each department.

Figure 6:
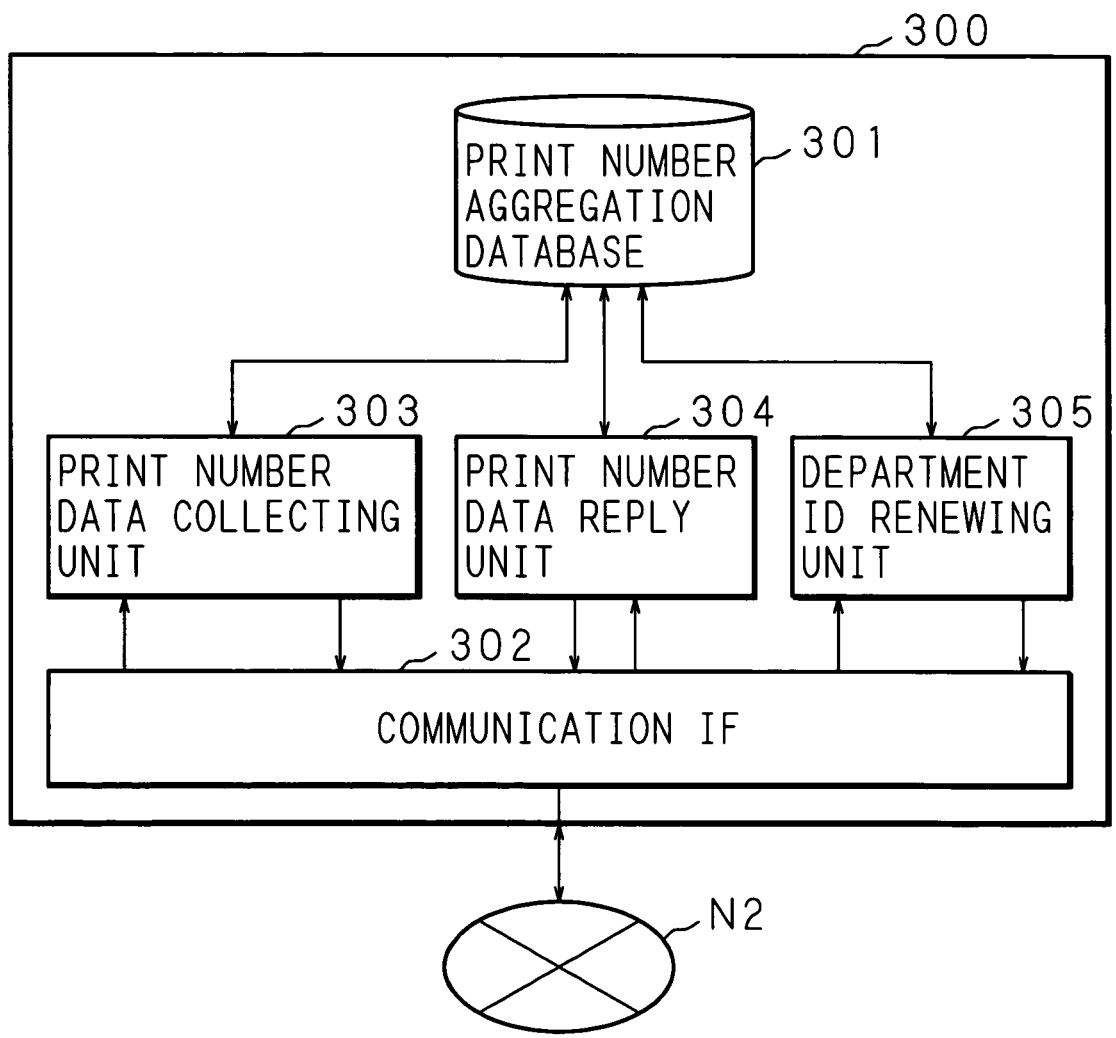
FIG. 6 is a block diagram showing an internal configuration of an aggregating server.

FIG. 6 is a block diagram showing an internal configuration of the aggregating server 300. The aggregating server 300 comprises a print number aggregation database 301, a communication IF (transmitting unit) 302, a print number data collecting unit 303, a print number data reply unit 304 and a department ID renewing unit 305, and aggregates the number of prints for each image forming apparatus (100a, 100b).

The print number aggregation database 301 manages the information of the print number for each department and the print number for each user with respect to each image forming apparatus. FIGS. 7A and 7B are conceptual views showing one example of the print number aggregation database 301. The print number aggregation database 301 is constructed of the print number aggregation data for each department shown in FIG. 7A and the print number aggregation data for each user shown in FIG. 7B.

The communication IF 302 comprises an interface according to the communication standard of the communication network N2, and is configured to transmit/receive data to/from the image forming apparatus 100, the department-management server 200 and the administrator terminal 400 via the communication network N2 and the communication network N1.

The print number data collecting unit 303 collects the print number data for each department and each user accumulated in the image forming apparatus 100, and registers the collected data to the print number aggregation database 301. When accepting the transmission request of the aggregation data from the administrator terminal 400, the print number data reply unit 304 extracts the corresponding aggregation data from the print number aggregation database 301 and replies the resultant to the administrator terminal 400. The department ID renewing unit 305 receives the department ID that is periodically renewed at the department-management server 200 via the communication network N1 and the communication network N2, thereby renewing the department ID registered in the print number aggregation database 301.

Figure 8:
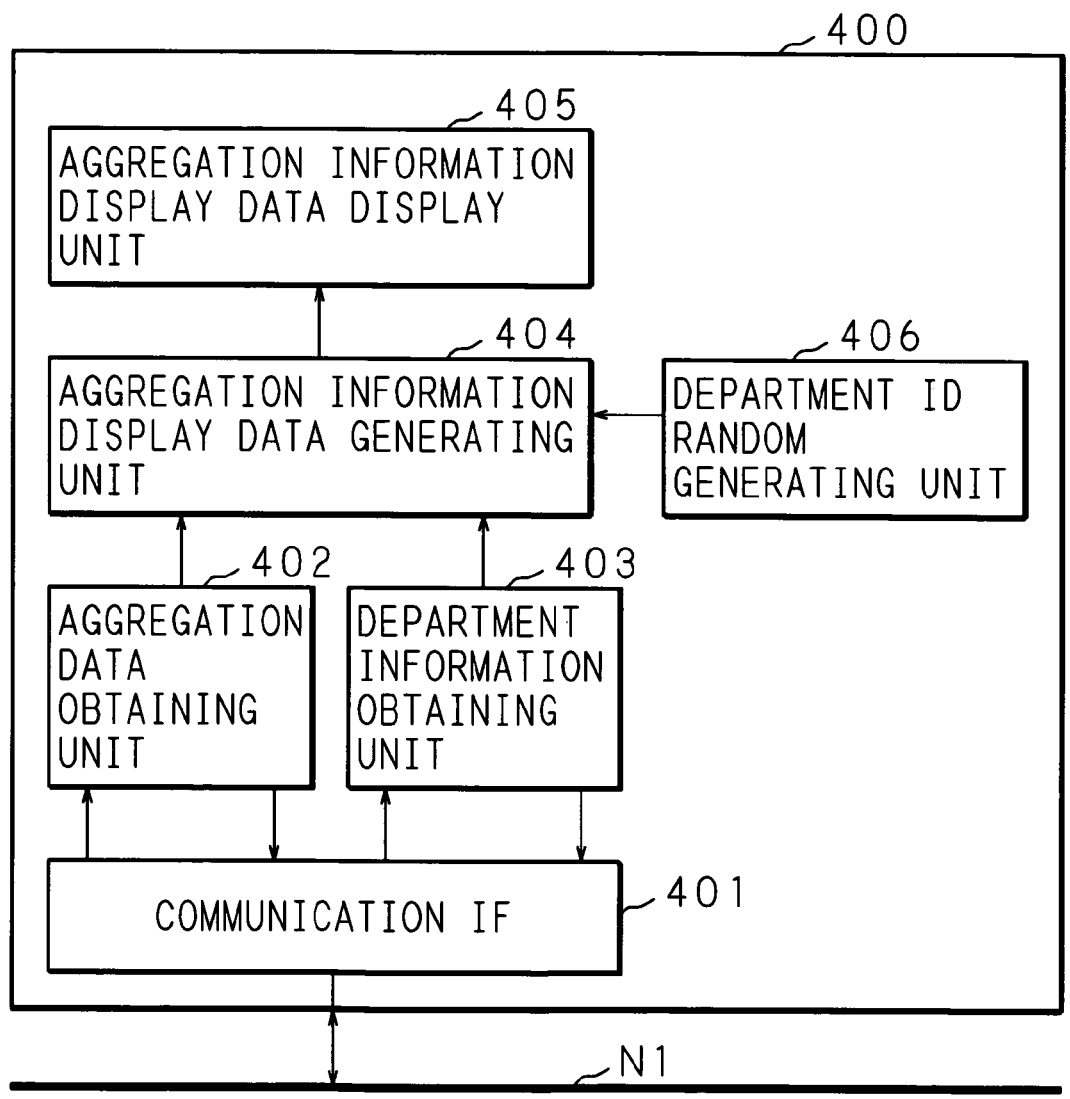
FIG. 8 is a block diagram showing an internal configuration of an administrator terminal.

FIG. 8 is a block diagram showing an internal configuration of the administrator terminal 400. The administrator terminal 400 comprises a communication IF (receiving unit) 401, an aggregation data obtaining unit 402, a department information obtaining unit 403, an aggregation information display data generating unit 404, an aggregation information display data display unit (display unit) 405 and a department ID random generating unit (generating unit) 406, and manages the use state of the image forming apparatus 100 connected to the communication network N1.

The communication IF 401 comprises an interface according to the communication standard of the communication network N1, and is configured to transmit/receive data to/from the image forming apparatus 100, the department-management server 200 and the user terminal 500 connected to the communication network N1 and the aggregating server 300 connected to the communication network N2.

The aggregation data obtaining unit 402 makes an inquiry at the aggregating server 300 to acquire the aggregation data for each department and each user. The acquired aggregation data is sent to the aggregation information display data generating unit 404. The department information obtaining unit 403 makes an inquiry at the department-management server 200 to acquire department information. The acquired department information is sent to the aggregation information display data generating unit 404. The aggregation information display data generating unit 404 generates aggregating information display data from the aggregation data sent from the aggregation data obtaining unit 402 and the department information sent from the department information obtaining unit 403. The aggregation information display data display unit 405 displays the aggregation information display data generated by the aggregation information display data generating unit 404. The department ID random generating unit 406 periodically generates the department ID at random. The generation of the department ID by the department ID random generating unit 406 is synchronous with the generation of the department ID performed by the department-management server 200, so that the same department ID is generated at both units. This synchronization can be realized by giving the same seed (e.g., the renewal date of the department ID) to the same pseudo-random number generator to generate a pseudo-random number and making the generated pseudo-random number as the department ID.

Hereinafter, the operation of the image forming system of this embodiment will be described with reference to flowcharts.

FIGS. 9A and 9B are flowcharts for describing a procedure when the image forming apparatus 100 executes a copying process. The image forming apparatus 100 is come into a state of waiting for an input of a user ID upon accepting the request for a copying process (step S11). In this case, the display device 109 of the image forming apparatus 100 displays that the input of the user ID is necessary to execute the copying process. In case that the input of the user ID is accepted from a user through the input device 108 (step S12), the inputted user ID is transmitted to the department-management server 200 to make an inquiry about the department ID (step S13).

The department-management server 200 is always in a state of waiting for the receipt of the user ID after the activation (step S14). In case of receiving the user ID transmitted from the image forming apparatus 100 (step S15), the department ID search unit 203 searches for the department ID associated with the received user ID by referring to the department ID management table 201 (step S16). Subsequently, the department ID search unit 203 determines whether there is a corresponding department ID or not (step S17). If it is determined that there is a corresponding department ID (S17: YES), it is determined whether the department associated with the searched department ID is the department that is allowed to use the image forming apparatus 100, i.e., whether the copying process is allowed or not (step S18). If it is determined that the copying process is allowed (S18: YES), the department ID is replied to the image forming apparatus 100 (step S19). Further, if it is determined that there is no corresponding ID in step S17 (S17: NO) and if the copying process is not allowed in step S18 (S18: NO), a fact that the copying process is not allowed is replied (step S20).

In case that the image forming apparatus 100 receives the reply from the department-management server 200 after completion of an inquiry about the department ID (step S21), it is determined whether the department ID is replied or not (step S22). If the department ID is determined to be replied (S22: YES), the display device 109 displays a fact that the copying process is allowed (step S23). Then, the image data acquired at the scanner unit 106 is sent to the printer unit 105 via the image data processing unit 104, and executes the copying process (step S24). In this case, the print control unit 101 counts the number of copies (step S25), and delivers the information of the number of copies to the print number counting unit 111 after completion of the copying process, whereby the number of copies is registered to the print number database 112 via the print number counting unit 111 (step S26).

Moreover, in case that the reply of non-allowance is received and the department ID is determined not to be replied in step 22, (S22: NO), the display device 109 displays a fact that the copying process is not allowed (step S27).

FIGS. 10A and 10B are flowcharts for describing a procedure when the image forming apparatus 100 executes the printing process. The image forming apparatus 100 is come into a state of waiting for a receipt of a print job upon accepting the request for printing process (step S31). In case that the image forming apparatus 100 receives the print job from the user terminal 500 through the communication IF 102 (step S32), the print job analyzing unit 103 extracts the user ID from the received print job (step S33) and delivers the extracted user ID to the user ID inquiry unit 107. Then, the print job analyzing unit 103 transmits the extracted user ID to the department-management server 200 to make an inquiry about the department ID (step S34).

The department-management server 200 is always in a state of waiting for the receipt of the user ID after the activation (step S35). In case that the department-management server 200 receives the user ID transmitted from the image forming apparatus 100 (step S36), the department ID search unit 203 searches for the department ID associated with the received user ID by referring to the department ID management table 201 (step S37). Subsequently, the department ID search unit 203 determines whether there is a corresponding department ID or not (step S38). If it is determined that there is a corresponding department ID (S38: YES), it is determined whether the department associated with the searched department ID is the department that is allowed to use the image forming apparatus 100, i.e., whether the printing process is allowed or not (step S39). If it is determined that the printing process is allowed (S39: YES), the department ID is replied to the image forming apparatus 100 (step S40). Further, if it is determined that there is no corresponding department ID in step S38 (S38: NO) and if the printing process is not allowed in step S39 (S39: NO), a fact that the printing process is not allowed is replied (step S41).

In case that the image forming apparatus 100 receives the reply from the department-management server 200 after completion of an inquiry about the department ID (step S42), it is determined whether the department ID is replied or not (step S43). If the department ID is determined to be replied (S43: YES), the image data acquired at the print job analyzing unit 103 is sent to the printer unit 105 via the image data processing unit 104 to execute the printing process (step S44). In this case, the print control unit 101 counts the number of prints (step S45) and delivers the information of the number of prints to the print number counting unit 111 after completion of the printing process, whereby the number of prints is registered to the print number database 112 via the print number counting unit 111 (step S46).

Moreover, in case that the department ID is determined not to be replied in step S43 (S43: NO), the print job received in step S32 is deleted (step S47).

In this embodiment, the aggregating server 300 is connected for collecting data of the number of prints accumulated in the image forming apparatus 100 for each department to perform a collectively management. When the aggregating server collects the data of the number of prints for each department, a furtive glance of the data makes it possible to infer the print state of the department and the relationship among the departments from the department ID, whereby there is a fear of information leakage. The effective method for solving this problem is to periodically renew the department ID possessed by the image forming apparatus 100 after the department ID is generated at random.

Figure 11:
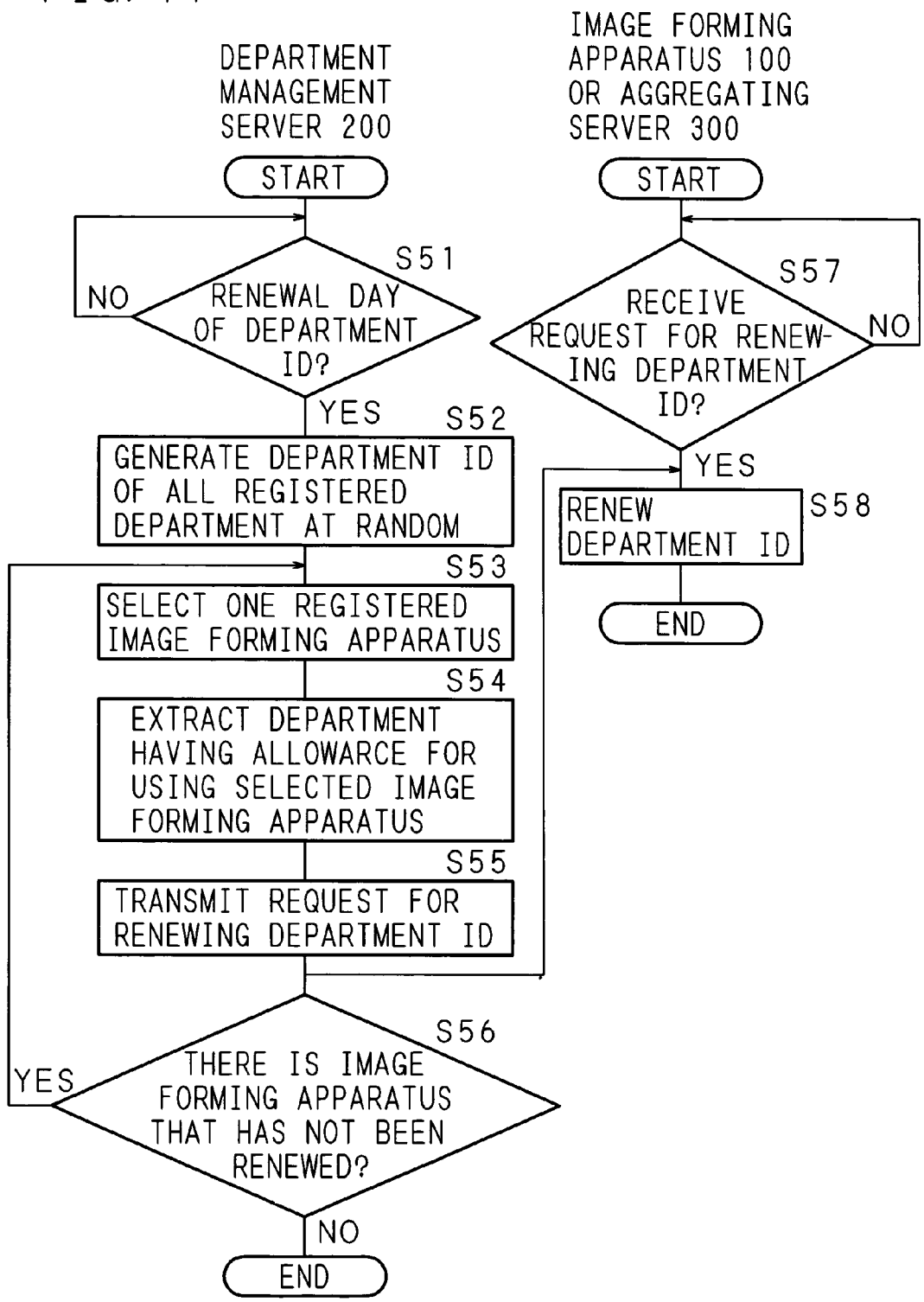
FIG. 11 is a flowchart for describing a procedure for renewing a department ID.

FIG. 11 is a flowchart for describing a procedure for renewing the department ID. The department-management server 200 firstly determines whether it is the renewal day of the department ID or not (step S51). If it is determined that it is not the renewal day (S51: NO), the department-management server 200 is in a stand-by state until the renewal day. If it is determined that it is the renewal day (S51: YES), the department ID random generating unit 204 generates the department IDs of all registered departments at random (step S52). Then, one registered image forming apparatus is selected (step S53) and the department having the allowance for using the selected image forming apparatus is extracted (step S54). Then, the request for renewing the department ID of the extracted department is transmitted to the image forming apparatus and the aggregating server 300 (step S55). Subsequently, it is determined whether there is an image forming apparatus that has not been renewed or not (step S56). If it is determined that there is an image forming apparatus that has not yet been renewed (S56: YES), the processes from step S53 to step S55 are executed. If it is determined that there is no image forming apparatus that has not yet been renewed (S56: NO), the process by this flowchart is ended.

The image forming apparatus 100 and the aggregating server 300 always determine whether the request for renewing the department ID is received or not (step S57). If it is determined that the request for renewing the department ID is not received (S57: NO), the image forming apparatus 100 and the aggregating server 300 are in a stand-by state until the image forming apparatus 100 and the aggregating server 300 receive the request for renewal. If it is determined that the request for renewing the department ID is received (S57: YES), the image forming apparatus 100 renews the department ID by the process wherein the department ID renewing unit 113 changes the content registered in the print number database 112, while the aggregating server 300 renews the department ID by the process wherein the department ID renewing unit 305 changes the content registered in the print number aggregation database 301 (step S58).

Subsequently, a process for displaying the aggregating result of the number of prints for each department at the administrator terminal 400 will be described. The aggregating server 300 aggregates the number of prints based upon the department ID. In case that the current aggregation information is displayed on the administrator terminal 400, the administrator terminal 400 makes an inquiry about the aggregation data at the aggregating server 300, whereby the department-management server 200 makes an inquiry about the department information such as a department name. Then, the data to be displayed of the aggregation information is formed based upon the acquired aggregation data and the department information, and then, this formed data is displayed. FIG. 12 is a flowchart for describing a procedure for displaying the aggregation information on the administrator terminal 400. In case that the administrator terminal 400 accepts the request for displaying the aggregation data (step S61), the aggregation data obtaining unit 402 of the administrator terminal 400 makes an inquiry about the aggregation data at the aggregating server 300 (step S62). The aggregating server 300 always waits for the inquiry about the aggregation data (step S63). When receiving the request for inquiring about the aggregation data from the administrator terminal 400 (step S64), the aggregating server 300 extracts the corresponding data from the print number aggregation database 301 and transmits the extracted data to the administrator terminal 400 as the aggregation data (step S65). The administrator terminal 400 receives the aggregation data transmitted from the aggregating server 300 (step S66) and sends the aggregation data to the aggregation information display data generating unit 404 through the aggregation data obtaining unit 402.

Further, the administrator terminal 400 makes an inquiry about the department information at the department-management server 200 (step S67). The department-management server 200 always waits for the inquiry about the department information (step S68). When receiving the request for inquiring about the department information from the administrator terminal 400 (step S69), the department-management server 200 extracts the corresponding information from the department ID management table 201 and transmits the extracted data to the administrator terminal 400 as the department information (step S70). The administrator terminal 400 receives the department information transmitted from the department-management server 200 (step S71) and sends the department information to the aggregation information display data generating unit 404 through the department information obtaining unit 403.

Then, the aggregation information display data is formed at the aggregation information display data generating unit 404 based upon the aggregation data sent from the aggregation data obtaining unit 402 and the department information sent from the department information obtaining unit 403 (step S72), whereby the aggregation information display data is displayed on the aggregation information display data display unit 405 (step S73). FIG. 13 is a schematic view showing one example of the aggregation information displayed on the administrator terminal 400. Herein, the information of the number of copies and the number of prints is classified for each department and for each user to be displayed as a list.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image forming system comprising:
    an image forming apparatus that accepts a job for instructing an image formation and executes the image formation on a sheet based upon the accepted job; and
    a management apparatus that is connected to said image forming apparatus and manages information relating to a user of said image forming apparatus, wherein
    said image forming apparatus comprises:
    an accepting unit for accepting a user ID relating to the user when accepting the job for instructing the image formation;
    a transmitting unit for transmitting the accepted user ID to said management apparatus;
    a counting unit for counting the number of image formation; and
    a storing unit for aggregating the number of image formation for each department ID of each group to which each user belongs, and storing the aggregated number of image formation as associated with each department ID,
    said management apparatus comprises:
    a storing unit for storing plural pieces of information according to the user ID and the department ID, the department ID being associated with the user ID and generated at random;

a receiving unit for receiving the user ID transmitted from said image forming apparatus;

a search unit for searching for the department ID associated with the received user ID from the storing unit; and a transmitting unit for transmitting the searched department ID to said image forming apparatus, and a generating unit for generating a random number, generating department IDs of all groups to be stored based upon the generated random number, and setting the generated department IDs in the storing unit as associated with each user ID, and said management apparatus extracts a department ID of a group allowed to use the image forming apparatus from the department IDs generated by the generating unit, and notifies the image forming apparatus of the extracted department ID as a department ID for renewing so as to renew the department ID in the storing unit of the image forming apparatus, and said image forming apparatus executes the image formation when receiving the department ID transmitted from said management apparatus, and renews the department ID in the storing unit with the department ID for renewing when being notified of the department ID for renewing from the management apparatus.

2. The image forming system according to claim 1, wherein said management apparatus further comprises:

a second storing unit for storing information as to whether the image formation determined for each group is allowed or not;

a determining unit for determining whether the image formation is allowed or not based upon the searched department ID; and a stop unit for stopping the transmission of the department ID when the image formation is determined not to be allowed.

3. The image forming system according to claim 2, wherein said management apparatus further comprises a notifying unit for notifying said image forming apparatus that the image formation is not allowed, when the image formation is determined not to be allowed.

4. The image forming system according to claim 1, wherein the job accepted by said image forming apparatus includes the user ID, and said image forming apparatus further comprises an extracting unit for extracting the user ID from the job.

5. The image forming system according to claim 1, further comprising:

an aggregating device, wherein plural image forming apparatuses are provided, and said aggregating device is connected to said image forming apparatuses and aggregates the number information relating to the number of image formation of each group counted by each image forming apparatus.

6. The image forming system according to claim 5, further comprising an administrator terminal connected to the aggregating device, wherein said aggregating device comprises a transmitting unit for transmitting the aggregated number information to said administrator terminal, and said administrator terminal further comprises:

a receiving unit for receiving the number information transmitted from said aggregating device; and a display unit for displaying the received number information as associated with each group.

7. The image forming system according to claim 6, wherein said administrator terminal further comprises a generating unit for generating the random number in synchronism with said management apparatus.

8. A management apparatus that is connectable to an information apparatus and manages information relating to a user of the information apparatus to be connected, comprising:

a storing unit that stores plural pieces of information according to a user ID and a department ID of a group to which each user belongs and associated with the user ID, the department ID being generated at random;

a receiving unit that includes the user ID and receives a search request of the department ID from the outside;

a search unit that searches the department ID associated with the user ID in accordance with the received search request from the storing unit;

a transmitting unit for transmitting the searched department ID to one which asks for the search request; and a generating unit for generating a random number, generating department IDs of all groups to be stored based upon the generated random number, and setting the generated department IDs in the storing unit as associated with each user ID, wherein the management apparatus extracts a department ID of a group allowed to use the information apparatus from the department IDs generated by the generating unit, and notifies the information apparatus of the extracted department ID.

9. The management apparatus according to claim 8, further comprising:

a second storing unit for storing information as to whether the use of said information apparatus determined for each group is allowed or not;

a determining unit for determining whether the use of said information apparatus is allowed or not based upon the searched department ID; and a stop unit for stopping the transmission of the department ID when it is determined that the use is not allowed.

10. An image forming apparatus that accepts a job for instructing an image formation and executes the image formation on a sheet based upon the accepted job, wherein the image forming apparatus is connected to a managing apparatus that comprises:

a storing unit for storing plural pieces of information according to a user ID and a department ID of a group to which each user belongs and associated with the user ID, the department ID being generated at random; and a generating unit for generating a random number and generating the department ID based upon the generated random number, the image forming apparatus being notified of the generated random number by the generating unit so as to renew a department ID to be used in the image forming apparatus with the generated department ID, the image forming apparatus comprises:

a second storing unit for storing information as to whether an image formation determined for each group is allowed or not;

an accepting unit for accepting the user ID relating to a user upon accepting the job for instructing the image formation;

a search unit for causing the managing apparatus to search for the department ID associated with the accepted user ID;

a determining unit for determining whether the image formation is allowed or not based upon the department ID searched by the managing apparatus;

a counting unit for counting the number of image formation;

a storing unit for aggregating the number of image formation for each group, and storing the aggregated number of image formation as associated with each department ID; and a renewing unit for renewing the department ID in the storing unit with a department ID for renewing notified from the managing apparatus.

11. An information processing method comprising the steps of searching from a storing unit that stores plural pieces of information according to a user ID of a user and a department ID of a group to which each user belongs, for the department ID based upon the information of an information apparatus externally accepted, and the department ID being associated with the user ID and generated at random;

determining whether the use of said information apparatus is allowed or not based upon the searched department ID;

generating a random number to generate a department ID based upon the generated random number;

extracting a department ID of a group allowed to use the information apparatus from the generated department ID; and notifying the information apparatus of the extracted department ID.

12. A computer-readable recording medium on which a computer program is recorded, the computer program embodied in the computer-readable recording medium and comprising the steps of:

causing a computer to search from a storing unit that stores plural pieces of information according to a user ID of a user and a department ID of a group to which each user belongs, for the department ID based upon the inputted information of an information apparatus, and the department ID being associated with the user ID and generated at random;

causing the computer to determine whether the use of the information apparatus is allowed or not based upon the searched department ID;

causing the computer to generate a random number to generate a department ID based upon the generated random number;

causing the computer to extract a department ID of a group allowed to use the information apparatus from the generated department ID; and causing the computer to notify the information apparatus of the extracted department ID.

* * * * *